US012623854B2

(12) United States Patent
Caron et al.

(10) Patent No.: US 12,623,854 B2
(45) Date of Patent: May 12, 2026

(54) EARLY PACKAGE DAMAGE DETECTION

(71) Applicant: Dell Products L.P., Round Rock, TX (US)

(72) Inventors: Eric L. Caron, Ottawa (CA); Vinicius Michel Gottin, Rio de Janeiro (BR); Jason Bonafide, Winter Garden, FL (US); Nalinkumar Mistry, Ottawa (CA); Eric Bruno, Shirley, NY (US)

(73) Assignee: Dell Products L.P., Round Rock, TX (US)

( * ) Notice: Subject to any disclaimer, the term of this patent is extended or adjusted under 35 U.S.C. 154(b) by 480 days.

(21) Appl. No.: 18/174,984

(22) Filed: Feb. 27, 2023

(65) Prior Publication Data

US 2024/0286847 A1 Aug. 29, 2024

(51) Int. Cl.
*B65G 43/08* (2006.01)

(52) U.S. Cl.
CPC ...... *B65G 43/08* (2013.01); *B65G 2203/0216* (2013.01); *B65G 2203/0275* (2013.01); *B65G 2203/041* (2013.01); *B65G 2203/042* (2013.01)

(58) Field of Classification Search
CPC ............ B65G 43/08; B65G 2203/0216; B65G 2203/0275; B65G 2203/041; B65G 2203/042
See application file for complete search history.

(56) References Cited

U.S. PATENT DOCUMENTS

| | | | | |
|---|---|---|---|---|
| 8,296,101 | B1 * | 10/2012 | Barlow | G01B 21/00 |
| | | | | 702/182 |
| 11,970,343 | B1 * | 4/2024 | Terhuja | B65G 47/917 |
| 2012/0199648 | A1 * | 8/2012 | Hanson | G01C 21/20 |
| | | | | 235/375 |
| 2015/0161556 | A1 * | 6/2015 | Jena | G06Q 10/083 |
| | | | | 705/14.23 |
| 2016/0078510 | A1 * | 3/2016 | Gadre | G06Q 30/0611 |
| | | | | 705/26.4 |
| 2017/0280351 | A1 * | 9/2017 | Skaaksrud | H04W 36/302 |
| 2018/0143131 | A1 * | 5/2018 | Choi | G01N 21/3586 |
| 2019/0102874 | A1 * | 4/2019 | Goja | G06N 5/022 |
| 2019/0114714 | A1 * | 4/2019 | Jones | H04W 4/026 |
| 2019/0300259 | A1 * | 10/2019 | Ruth | G06Q 10/0833 |
| 2021/0394364 | A1 * | 12/2021 | Ogawa | B25J 9/1664 |
| 2022/0156682 | A1 * | 5/2022 | Rai | G06Q 10/087 |
| 2022/0366556 | A1 * | 11/2022 | Meckesheimer | G06Q 10/0832 |
| 2023/0144297 | A1 * | 5/2023 | Zhang | B65G 43/08 |
| | | | | 414/273 |
| 2023/0364787 | A1 * | 11/2023 | Cygan | B25J 9/163 |

OTHER PUBLICATIONS

U.S. Appl. No. 17/663,423, filed May 14, 2022, Gottin, et al.

* cited by examiner

*Primary Examiner* — Kyle O Logan
(74) *Attorney, Agent, or Firm* — Workman Nydegger

(57) ABSTRACT

Detecting damaged packages is disclosed. Transport mechanisms, such as pallets, are equipped with sensors including inertial sensors. The inertial data, in conjunction with characteristics of the packages such as fragility values, can be used to determine whether a package may be damaged. If damage is suspected, the package can be inspected. The ability to detect damage may also use package geometries and the like. When damage is suspected, remedial actions can be performed.

20 Claims, 6 Drawing Sheets

Associate Transport Mechanism to Package
502

Collect Sensor Data from Sensors of the
Transport Mechanism
504

Determine whether Package is Damaged
506

Perform Remedial Action
508

500

600

Storage Media
608

UI Device
610

Data Storage
612

Memory
602

NVRAM
604

Processor
606

Application(s)
614

EARLY PACKAGE DAMAGE DETECTION

FIELD OF THE INVENTION

Embodiments of the present invention generally relate to logistics operations. More particularly, at least some embodiments of the invention relate to systems, hardware, software, computer-readable media, and methods for detecting damage to packages.

BACKGROUND

There are many environments in which logistics operations are performed. A warehouse environment, including large warehouse environments, are often associated with multiple dynamic and mobile entities. For example, forklifts (manual or automated), autonomous automated robots (AMRs), and the like are examples of devices that may operate within a warehouse.

These devices are often used to perform logistics operations, which may including moving goods from one location to another location. More specifically, packages that are shipped may pass through various warehouse environments. In each of these environments, the packages may be unloaded, stored, loaded and shipped. Thus, there is a need to move packages of different types, shapes, and sizes. Logistics operations may include the operations and procedures followed to manage and perform the movement and storage of these packages.

As packages are moved or processed, some of the packages may become damaged or may arrive at the warehouse damaged. The damage can be caused for multiple reasons. Warehouses often include hazards and the devices used to move the packages do not always operate in a smooth manner. These devices may experience sudden accelerations/decelerations, turn too sharply, or the like. When packages (or the goods therein) are damaged, dealing with the damage can incur costs in terms of time, resources, and money.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
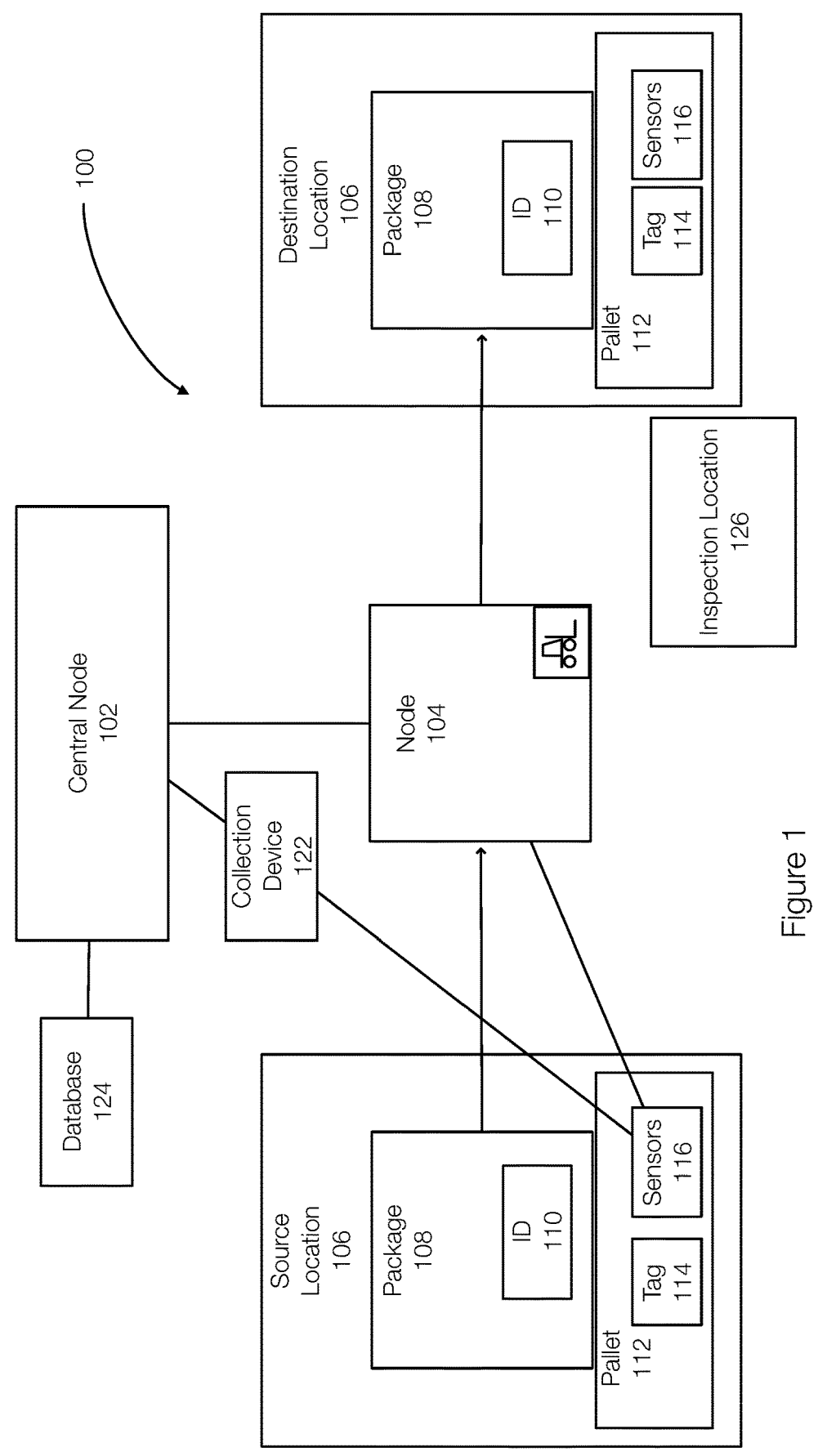
FIG. 1 discloses aspects of performing logistics operations in an environment.

Embodiments of the present invention generally relate to logistics operations. More particularly, at least some embodiments of the invention relate to systems, hardware, software, computer-readable media, and methods for detecting damaged packages.

Warehouses are examples of environments in which logistics operations are performed. Embodiments of the invention relate to performing various logistics operations in order to avoid incidents that may damage goods or packages that may be in transit. Embodiments of the invention further relate to identifying packages that may have been damaged (e.g., during transport) by tracking inertial measurements associated with the packages and characteristics (e.g., fragility, geometry) of the packages. By detecting damaged packages or potentially damaged packages, delivery times and delivery costs can be reduced.

As a package is shipped, the package may spend time in a warehouse or in transport. Thus, the package may be moved from one hub (e.g., warehouse) to another hub and may be moved inter-warehouse. In order to determine whether a package may have been damaged, the transport mechanism in or on which the package is loaded or place may be provided with a plurality of sensors such as inertial sensors. By relating the transport mechanism to the package, which may be performed by linking an identifier of the transport mechanism to an identifier of the package that is loaded on the transport mechanism, movements or other data acquired by the sensors of the transport mechanism can be used to determine whether a package may have been damaged. The data of the sensors may be evaluated in the context of package characteristics, such as fragility.

In a simple example, the sensors may report that the pallet experienced a certain acceleration. If that acceleration is more than what the package can sustain, based on the fragility value, embodiments of the invention may direct the package for inspection on the assumption that the package has been damaged.

More specifically, the ability to detect damage to packages can be at least partially achieved by tracking the movement of the transport devices (e.g., automated moving robots, forklifts, or the like) and/or tracking movement/characteristics of the transport mechanism (e.g., pallet, box, container). The acceleration/deceleration experienced by a pallet loaded on a forklift, for example, may differ from the acceleration/deceleration experienced by the forklift and may depend on sensor placement. By detecting events or circumstances that may cause damage (e.g., excessive speed/acceleration/deceleration) to a package, damage to packages may be avoided or determined prior to shipment. Embodiments of the invention allow packages to be inspected when damage is suspected or possible. This allows, if necessary, the package to be replaced or allows the replacement process to be initiated well before the package arrives at its final destination in a damaged form.

Embodiments of the invention relate to detecting (or avoiding) damage to packages by considering inertial measures from transport mechanisms that may be used to transport packages or goods. Embodiments of the invention may be discussed in the context of a pallet, which is one example of a transport mechanism that can be correlated to specific packages or specific goods.

To facilitate logistics operations, an array of sensors may be deployed to the pallet. The sensors may include, but are not limited to, inertial sensors configured to detect accelerations/decelerations, gyroscopes, RFID tags, or other sensors or the like.

The information from these sensors (and/or information from sensors associated with the transport device) may be used to determine the likelihood of whether a package has been damaged.

Packages may be similarly equipped with a unique identifier (e.g., a barcode, RFID tag) or the like. Packages may also be classified with a fragility rating or value, which may be reflected in the identifier. The fragility rating can be used, in conjunction with the sensor data, when assessing or monitoring for situations or scenarios that may cause damage to the package. More fragile packages, for example, may not be able to withstand accelerations/decelerations that other less fragile packages can withstand.

Because the pallets have an identifier (e.g., RFID tag) and the packages have an identifier (barcode/RFID tag), packages can be linked to specific pallets, for example, during a loading operation. The pallet-package relationship can be stored in a database. After the package or packages have been loaded on a pallet, data generated by the pallet's sensors can be evaluated to determine whether the packages loaded thereon may have experienced damage.

In one example, a node (e.g., the transport device or a computing device/system integrated into the transport device) may track the pallet handled by that node. More specifically, the node may be able to receive data from the sensors on the pallet, for example during transport. Because the pallet is linked to the packages loaded on the pallet, the packages can also be tracked and associated with the data from the sensors.

This data from the pallet can be received by and evaluated by the node. The data can also be transmitted by the node to a central node, which may have comparatively computing resources (processors, memory storage), for processing.

In another example, the sensor data may be acquired along the transport path. Doors, passageways, or other areas of an environment may be provided with collection devices capable of reading the sensors on the pallet or receiving transmissions from the sensors.

The data collected from the pallet's sensors can be evaluated or analyzed at the node, at the collection device, at a central node (e.g., edge system, datacenter, cloud), or the like. The data may be collected as time series data. Further, the sensors may have some memory such that data can be stored and can be collected/transmitted at different times when within range of a collection device.

For example, the data from the sensors may indicate that one or more of the packages on a pallet experienced a level of acceleration/deceleration than what the package is rated and should be able to sustain given its fragility rating. In this case, the device (if autonomous) or a driver or operator of a device may be warned or instructed to deliver the pallet or the package to an inspection location where the package can be inspected for damage.

In another example, the node may be configured to perform reporting and/or learning operations. For example, a node (or the central node) may able to correlate high accelerations/decelerations with damaged packages and/or to the characteristics of the packages loaded on the pallet. Thus, undamaged packages, their fragility rating and or other characteristics such as geometry and their associated inertial data and other sensor can be stored and used to train a machine learning model. If the model is an autoencoder, normative events may be reconstructed with low error. Non-normative events, which may indicate damage, may have higher reconstruction errors. Thus, after sufficient training data has been acquired, a decision may be made based on the inference of the machine learning model regarding the likelihood that a package is damaged. In another example, the decision may be rule based. In either case, a decision may be made to have a package inspected based on the sensor data, fragility ratings, and/or detected geometry.

FIG. 1 discloses aspects of performing logistics operations in an environment. FIG. 1 illustrates an environment 100, which may be a warehouse environment. A node 104, which is representative of multiple nodes, operates in the environment 100. The node 104 is associated with or is part of a mobile device in this example, such as a forklift, an automated moving robot (AMR), or the like. The node 104 may include computing resources such as a processor, memory, and communication hardware.

The node 104 may be configured to communicate with a central node 102. The central node 102 may be an edge system, a local system, a cloud-based system, or the like. The central node 102 typically has comparatively more computing resources than the node 104.

In this example, the node 104 (or the device in which the node 104 resides) is configured as a transport device configured to move packages from a source location 106 to a target location 118. The transport device may use various transport mechanisms such as the pallet 112.

The source location 106 may be any location in the environment 100 (e.g., floor, shelf, room). The target location 118 may be any location in the environment 100. In one example, the source location 106 may be an incoming truck making a delivery to the environment 100. In one example, the target location 118 may be a truck for performing deliveries to locations outside of the environment 100.

In this example, a pallet 112 is present at the source location 106. The pallet 112 may have accompanied the package 108 from an originating shipment location. The pallet 112, which is an example of a transport mechanism capable of being carried by a transport device such as the node 104, has been loaded with a package 108, which is representative of multiple packages. When the pallet 112 was loaded with the package 108, the identifier (ID) of the package 108 was associated with an identifier (e.g., tag 114) of the pallet. The relationship may have been stored in a database 124.

The pallet 112 may also include sensors 116, which may include, by way of example, inertial sensors, gyroscopes, or the like. The sensors 116 may collect or generate data associated with movement of the pallet 112. Thus, inertial data and the like may be collected as the pallet 112, loaded with the package 108, is lifted by the node 104, transported to the target location 118, and placed or deposited.

Before, during, and/or after transport, the sensors 116 may transmit data or be read by a reading or collection device. In one example, the environment 100 may include collection devices, represented by the collection device 122. When the pallet 112 passes within range of the collection device 122, data from the sensors 116 may be transmitted to or read by the collection device 122. In turn, the data from the sensors 116 may be provided by the collection device 122 to the central node 102 and may be stored in the database 124. The collection device 122 may also associate the collected data with the tag 114 and, as a result, with the package 108.

Alternatively, the node 104 may collect or receive data from the sensors 116. The node 104 may have the computing resources to analyze the data from the sensors 116 or may transmit the data to the central node 102.

Regardless of where the data from the sensors 116 is evaluated or analyzed, a logistic decision may be made and conveyed to the node 104 or other device. If the data from the sensors 116 indicates that the package is/may be damaged, then the node 104 may deliver the pallet 112 to an inspection location 126 such that the package 108 can be inspected. If the determination that the package is damaged is determined after delivery, an instruction to retrieve the package for inspection may be sent to any of the relevant nodes.

The identifier 110 of the package 108 may include information in addition to an identifier for the package 108. The identifier 110 may also represent a fragility rating for the package 108, a package geometry, or the like.

The process of loading the pallet 112 with the package 108 can be automated or manual. In both cases, the pallet 112 is related to the package 108 loaded thereon. This is achieved by reading and relating the tag 114 and the identifier 110. The relationship may be stored in the database 124. The fragility rating may be known from a shipping origin or encoded in the identifier 110.

In a manual loading operation, a user may use a device (e.g., an RFID reader/barcode reader) to scan and associate the tag 114 and the identifier 110. In an automated loading operation, a loading mechanism or other mechanical device may be configured with a reading device that can automatically read the tag 114 (e.g., an RFID reader is embedded in an arm of the loading mechanism) such that the tag 114 is read when sufficiently close. The ID 110 may similarly be scanned/read in an automated manner during loading. For example, when the loading arm places a package on a pallet, the reader may be activated to read the identifiers of both the package and the pallet such that they are related in the database 124.

Figure 2:
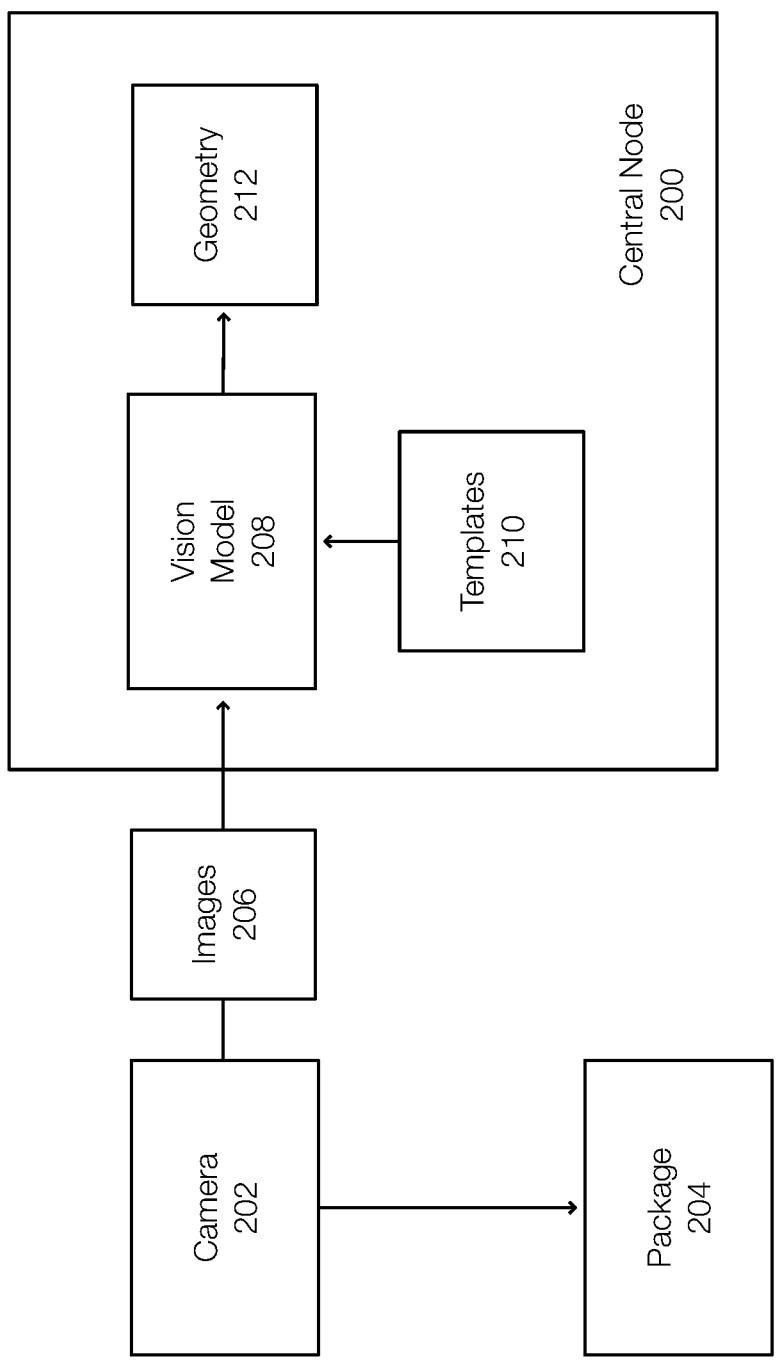
FIG. 2 discloses aspects of recognizing or determining package geometries.

FIG. 2 discloses aspects of identifying or determining a geometry of a package. In one example, embodiments of the invention may determine whether the geometry of a package is typical or atypical rather that determining the specific shape of the package. A package having a smashed corner, which is indicative of damage, may have a shape that is identified as atypical.

In this example, a computer vision model 208, which may operate at a central node 200, receives images 206 (e.g., from a video stream) of the package 204 that may be generated by a camera 202. The vision model 208, which may be trained to recognize typical geometrics of packages, may generate or determine a geometry 212 of the package 204 based on the images 206. In one example, the geometry 212 may be "typical", which indicates that the geometry of the package 204 is similar to geometries stored as templates 210.

In one example, the camera 202 may be located at the source location and/or at a target location such that the geometry of the package 204 can be determined during the loading operation and/or during the unloading operation. In some examples, the geometry of the package 204 maybe provided by a shipping entity and may be represented in the identifier of the package 204. If necessary, the geometry 212 (the model classification) output by the vision model 208 may be verified by a person. Thus, a package whose geometry is not identified as typical or is unknown may be reviewed by a user. This may allow damaged packages to be identified during the loading operation. In another example, a user may set a flag or provide input representing the geometry of the package 204 that is associated with the pallet on which the package 204 is loaded.

In another example, a pallet may be loaded with multiple packages. Each of the packages may have a different fragility rating. The various fragility ratings may be combined to provide the pallet with a fragility index. Determinations regarding whether a package is damaged may be based, at least in part, on the fragility index. In one example, a pallet may be loaded with packages having different fragility ratings. The fragility index of all packages on the pallet may be selected to be the highest fragility rating. In another example, the geometry of the packages may be considered when determining the fragility index. Each geometry class may be associated with a different fragility index or value.

During a loading operation, the tracking database can also store images of each package or images of a loaded pallet, which can be associated with package format, geometry, and fragility rating. As this database grows, the data can be used to train a model that may be able to infer a better fragility rating based on past events of similar packages. In other words, pallets loaded with packages of different fragility ratings may be transported and data associated with that transport may be collected as training data. This allows associations between fragility ratings, fragility indexes, and the like to be evaluated in the light of actual sensor data. Over time, the image of a loaded pallet can be used to determine whether a package has been damaged.

Further, this would allow the model to generate a fragility rating recommendation based on an image of the package or packages being loaded. This improves the performance of the logistics operations because the ability to infer or determine that a package may be damaged may depend on the fragility rating/index. More accurate fragility ratings/indexes may result in more accurate determinations regarding damaged packages.

Figure 3B:
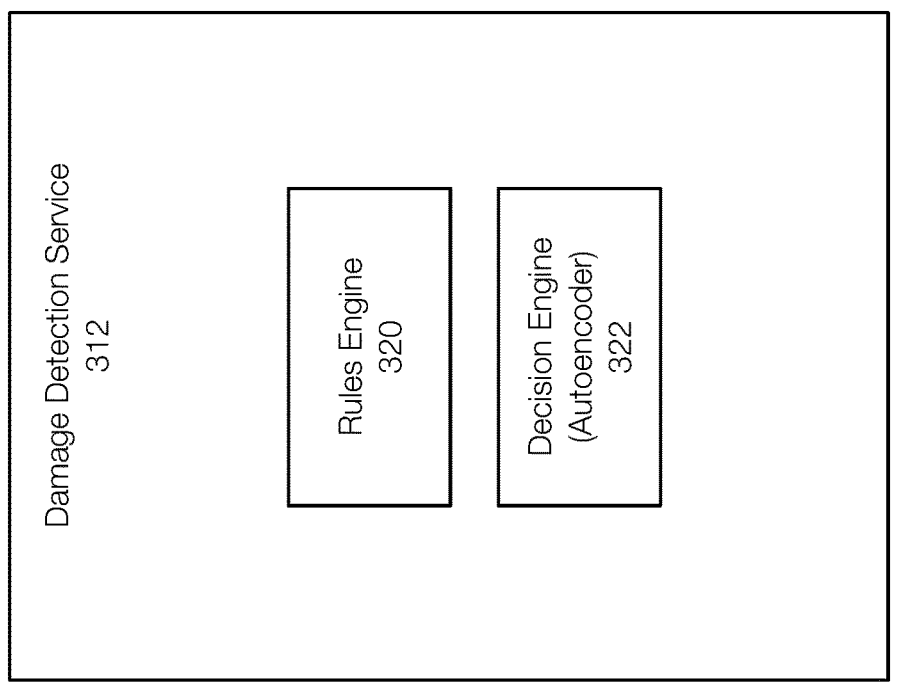
FIG. 3B discloses aspects of a damage detection service.
Figure 3A:
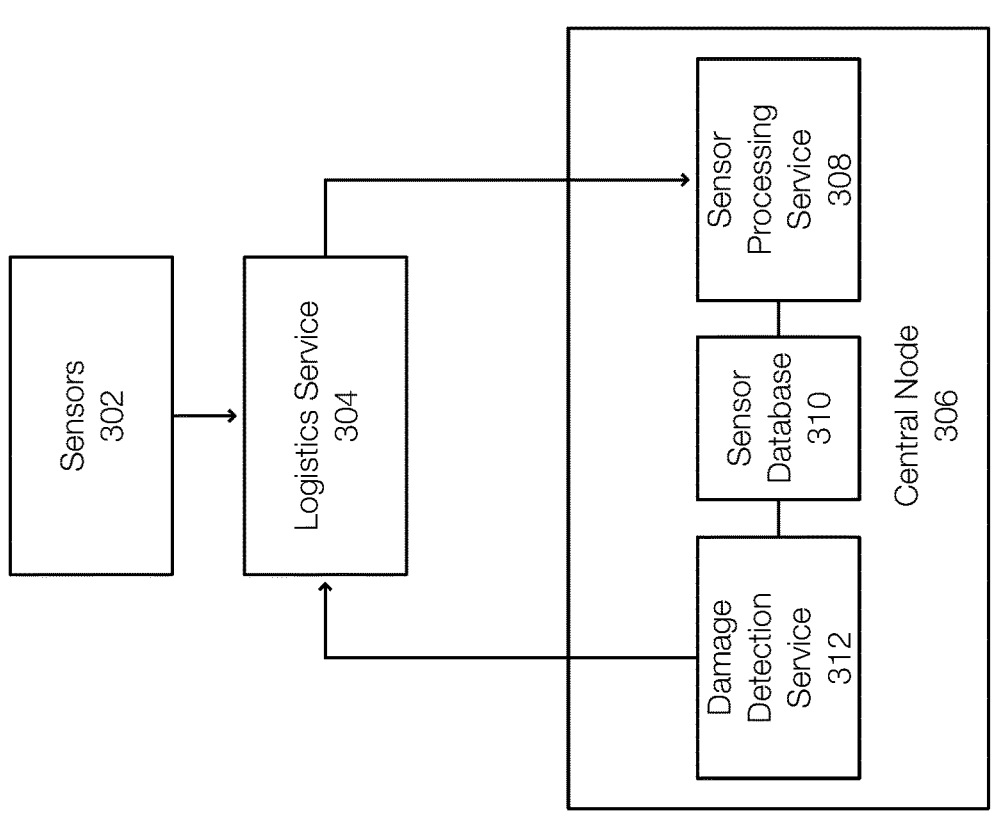
FIG. 3A discloses aspects of a logistics service.
Figure 4:
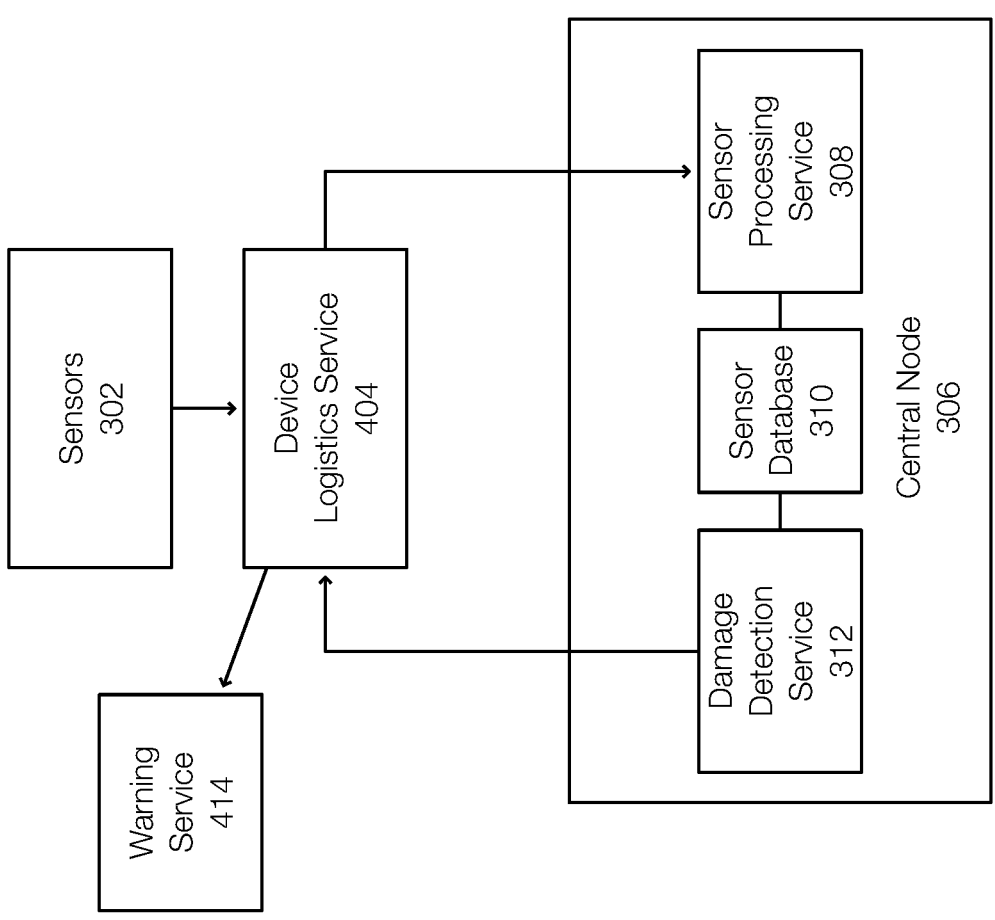
FIG. 4 discloses aspects of a device logistics service.

The logistics operations can be orchestrated in different manners. FIGS. 3A-4 illustrate examples deploying logistics services in an environment. These examples may all be implemented together and are not necessarily exclusive. FIGS. 3A and 3B relate to a logistics service that is deployed in the environment. FIG. 4 relates to a logistics service that is deployed to the nodes in the environment.

The sensors deployed to the transport mechanisms may be associated with or include telematic devices or capabilities. This allows the data collected or generated by the sensors to be transmitted on command, periodically, when requested, or the like. These telematic devices may communicate using various communication technologies such as telecommunications networks, local area (e.g., WiFi) networks, Bluetooth, RFID type communications, or the like or combinations thereof.

FIG. 3A discloses aspects of a logistics service that is deployed to the environment. The logistics service 304 may be configured to collect/receive data from sensors 302 that have been deployed to transport mechanisms, such as pallets. In addition to collecting sensor data (e.g., inertial data, identifier, fragility rating) from the sensors 302, the logistics service 304 may also collect contextual data such as position, angle of operation (from a gyroscope), current load weight, or the like. Some of this information may be provided from other sensors on the pallet, sensors on nodes, or environmental sensors. Other information, such as center of gravity of the pallet may be calculated.

The logistics service 304 may operate in a computing node may be placed in the environment. For example, the logistics service 304 may operate on a computing device located at or near an entry or exit point of a warehouse. As pallets pass through this point and the information can be collected or read from the sensors of the pallets.

The data (sensor data and contextual data) may be transmitted to the central node 306 and processed by a sensor processing service 308, which stores the data in a sensor database 310. The sensor processing service 308 may process the data, particularly if in raw form. For example, the sensor processing service 308 may associate the inertial data to location, and the like. A damage detection service 312 can evaluate the data stored in the sensor database 310 to determine whether a package on the device is damaged or to determine if there is a likelihood that a package has been damaged. The damage detection service 312 may use, in one example, inertial measurements and/or a fragility rating/index. If the damage detection service 312 determines that a package is damaged or likely damaged, the package is designated for inspection. In one example, the logistics service 304 may be notified and may take action. For example, the logistics service 302 may direct that the package be delivered to an inspection location. Alternatively, the action taken may be directed to a node, a user, or the like that may facilitate inspection of the package on the pallet.

As previously stated, the sensors 302 may be equipped with telematic capabilities, which may allow package movements to be tracked during in-hub and inter-hub transportation. If the telematics devices are connected through a mobile network, the replacement or remedial operation may be triggered before the packages arrive at their next hub.

FIG. 3B discloses aspects of the damage detection service. The damage detection service 312 may be implemented as a rules engine 320 or a decision engine (an autoencoder) 322. In one example, the damage detection service 312 may operate as a rules engine 320 until sufficient data has been collected to train the decision engine 322.

The rules engine 320 may include static rules. For example, the rules may include limits on acceleration/deceleration. Additional rules may account for a fragility rating of a package or the fragility index of all packages on the pallet. Using experiments, the inertial limits can be adjusted as packages are inspected after being manipulated by forklifts or automated moving robots. For example, a certain inertial limit and a given fragility value may result in many packages being examined for damage. If the packages are not, in fact, damaged, the inertial limit may be adjusted or changed. The history of inertial values/fragility values and actual damaged packages may aid in setting an appropriate inertial limit or threshold.

When sufficient data is available (sensor data, inertial values, fragility values, damage results), a decision engine 322 may be trained. The decision engine 322 may be trained in an unsupervised fashion. In one example, the sensor data and/or contextual data (an example of input data) may be input to the decision engine 322 once trained. If the autoencoder is trained with normative data, a reconstruction error generated in response to the input data is low and indicates that that package is unlikely to be damaged. When data corresponding to a situation where the package is damaged, the reconstruction error is higher or above a threshold level. The threshold of maximum allowed reconstruction error may be based on the fragility index of the pallet. Higher fragility indexes may indicate a lower tolerance for reconstruction errors. Thus, transport devices such as forklifts or automated robots with fragile loads are more likely to be constrained during operation.

FIG. 4 discloses aspects of a device logistics service. In the example of FIG. 4, the device logistics service 404 may operate in a manner similar to the logistics service 304. However, the device logistics service 404 may also listen for damaged package detection alerts and is deployed to nodes in the environment. If such as alert is received, the device logistics service 404 may notify a driver via a warning service 414 to deliver the package, for example, to an inspection location such that the package can be inspected. The device logistics service 404 may also communicate with and receive data from the sensors 302. For example, a forklift may pick up a pallet for loading or that has been loaded. This allows the forklift to read the sensors or receive data from the sensors 302. In addition, additional data such as mast height, load weight, position, and the like can be added to the data that may be processed or used to perform the logistics operations discloses herein.

In one example, the device logistics service 404 may collect sensor data from the sensors 302 using, for example RFID communications. These readings can be transmitted to the central node 306 and processed as previously described. Thus, the damage detection service 312 may transmit a notification to the device logistics service 404 that a package may be damaged and the device logistics service 404 can transmit a warning to the driver via a warning service 414.

IN various embodiments, the services disclosed herein may operate in different locations, such as on a node, at a central node, at infrastructure placed in the environment, or the like or combination thereof. The transmission of sensor data and the data path may depend on how the data is collected and evaluated.

For example, in a cloud configuration, the inertial sensors of a device may be connected using a network such as a 4G network. In a near edge configuration, the sensors may connect to a local network. In either configuration, acceleration, deceleration, pallet angle data, or the like are collected. These data may be stored in the near edge or in the cloud. If the inertial sensors or other sensors are not continually connected to networks. Data may be saved in storage local to the sensors. When a pallet arrives at a next location, the data of the sensors may be collected by near edge applications on forklifts, AMRs, or other devices and decisions to inspect packages may be made at that time.

In one example, embodiments of the invention may include a fragility suggestion engine. By combining historical data about package geometry and past incidents from similar packages, the fragility suggestion engine may suggest a fragility level to assign for driving assistance.

Embodiments of the invention allow the fragility of each package on a pallet to be read and allow a fragility index to be determined based on the fragility values of the packages and/or the weight of the pallet.

Figure 5:
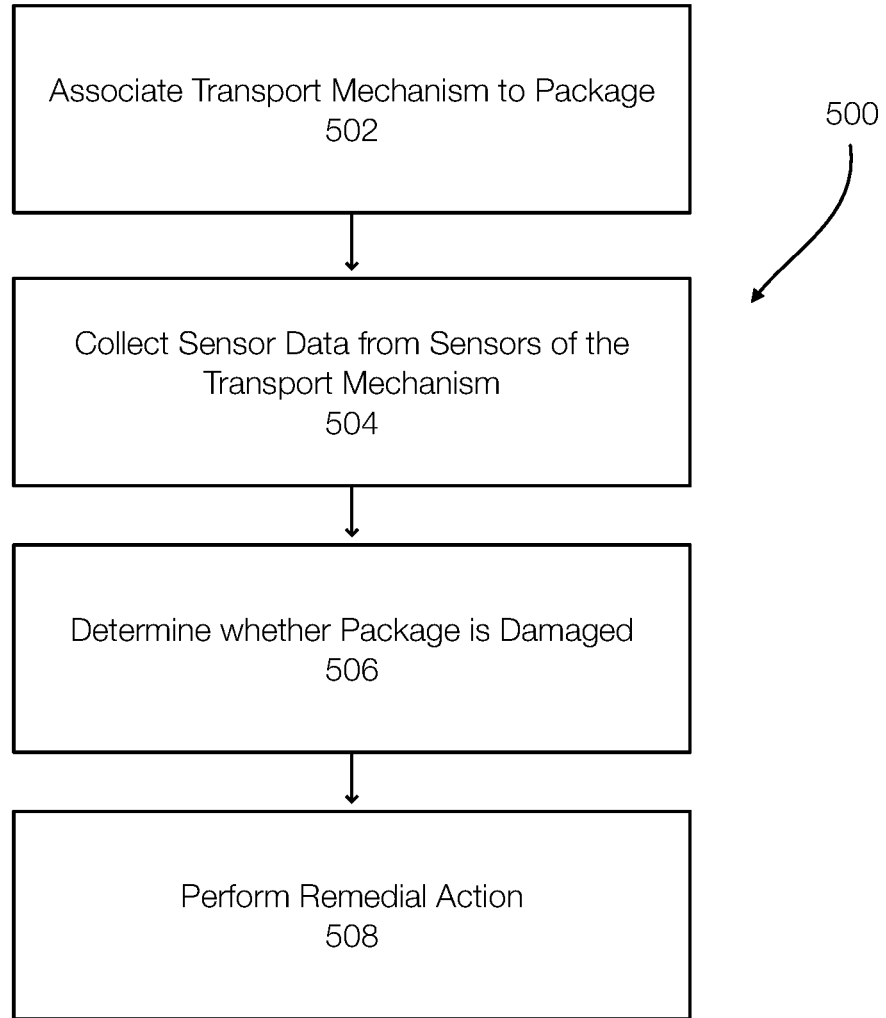
FIG. 5 discloses aspects of determining whether a package is damaged or may be damaged.

FIG. 5 discloses aspects of detecting damaged or potentially damaged packages. The method 500 includes associating 502 a transport mechanism (e.g., a pallet) to a package or to multiple packages. This may be performed when the package is loaded onto the transport mechanism. In one example, an identifier of the package or identifiers of packages and an identifier of the transport mechanism are read or acquired and linked. This information may be stored in a database.

Later, sensor data from sensors associated or attached to the transport mechanism are collected 504. The data may be collected by a collection device place in an environment. The data may be collected when transmitted by the sensors. The data may be collected when read by a node. The sensor data is then evaluated to determine 506 whether a package is damaged. More specifically, the evaluation may determine that a package may be damaged based on the collected sensor data and/or other contextual data.

If damage is detected or inferred, a remedial action is performed 508. The remedial action may include inspecting the package for damage, directing the package to be delivered to an inspection location for inspection, or the like.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, logistics operations, fragility determination operations, geometry detecting operations, damage assessment/detection operations, or the like or combination thereof. More generally, the scope of the invention embraces any operating environment in which the disclosed concepts may be useful.

New and/or modified data collected and/or generated in connection with some embodiments, may be stored in a storage environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter that is cloud-based, edge-based, or local.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients (e.g., nodes, sensors) that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, computing system components such as databases, storage servers, storage volumes (LUNs), storage disks, services, servers, and clients, for example, may likewise take the form of software, physical machines, containers, or virtual machines (VM), though no particular component implementation is required for any embodiment.

Example embodiments of the invention are applicable to any system capable of storing and handling various types of objects, in analog, digital, or other form.

It is noted that any operation(s) of any of the methods disclosed herein and in the Figures, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in any way.

Embodiment 1. A method comprising: associating a transport mechanism with a package, collecting sensor data from sensors associated with the transport mechanism, wherein the sensor data is associated with the package, determining whether the sensor data indicates that the package is damaged, and performing a remedial action when the sensor data indicates that the package is damaged.

Embodiment 2. The method of embodiment 1, further comprising loading the package on the transport mechanism, the transport mechanism comprising a pallet.

Embodiment 3. The method of embodiment 1 and/or 2, wherein the sensors comprise inertial sensors and a gyroscope, wherein the sensors include telemetric capabilities.

Embodiment 4. The method of embodiment 1, 2, and/or 3, further comprising reading an identifier of the package and an identifier of the transport mechanism.

Embodiment 5. The method of embodiment 1, 2, 3, and/or 4, wherein the identifier of the package includes a fragility value, further comprising determining whether the sensor data and the fragility value indicate that the package is damaged.

Embodiment 6. The method of embodiment 1, 2, 3, 4, and/or 5, further comprising determining whether a geometry of the package is typical or atypical.

Embodiment 7. The method of embodiment 1, 2, 3, 4, 5, and/or 6, further comprising determining whether the sensor data indicates that the package is damaged using a damage detection service that includes a rules engine or a decision engine comprising an autoencoder.

Embodiment 8. The method of embodiment 1, 2, 3, 4, 5, 6, and/or 7, wherein multiple packages are loaded on the transport mechanism, further comprising determining a fragility index based on fragility values of the multiple packages.

Embodiment 9. The method of embodiment 1, 2, 3, 4, 5, 6, 7, and/or 8, wherein input to the damage detection service includes the sensor data and contextual data.

Embodiment 10. The method of embodiment 1, 2, 3, 4, 5, 6, 7, 8, and/or 9, further comprising collecting the sensor data by a node and/or by a collection device placed in an environment.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, client, engine, agent, or the like may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
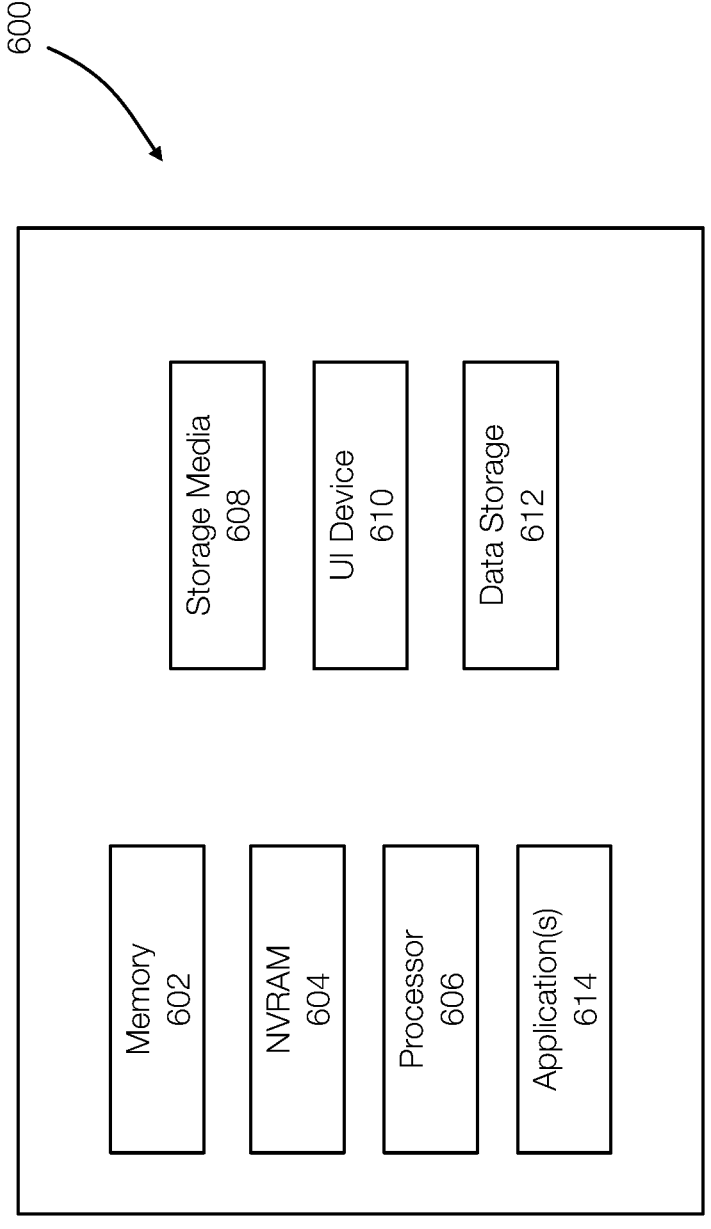
FIG. 6 discloses aspects of a computing device, system, or entity.

With reference briefly now to FIG. 6, any one or more of the entities disclosed, or implied, by the Figures, and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 602 which may include one, some, or all, of random access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The computing device 600 may also illustrate a server computer, a system of computers, an edge system, a datacenter or cloud-based system, or the like.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

associating a transport mechanism with a package, including reading an identifier of the package and an identifier of the transport mechanism;

collecting sensor data from sensors associated with the transport mechanism, wherein the sensor data is associated with the package, the sensors being configured to transmit data to a node or collection device within an environment;

determining whether the sensor data indicates that the package is damaged by evaluating the sensor data in conjunction with a fragility value encoded in the identifier of the package and using a damage detection service comprising a decision engine trained with normative sensor data to identify deviations based on reconstruction error thresholds related to a fragility index; and performing a remedial action when the sensor data indicates that the package is damaged by directing the package to an inspection location prior to shipment.

2. The method of claim 1, further comprising loading the package on the transport mechanism, the transport mechanism comprising a pallet.

3. The method of claim 1, wherein the sensors comprise inertial sensors and a gyroscope, wherein the sensors include telemetric capabilities.

4. The method of claim 1, wherein the associating step comprises storing the identifiers in a database.

5. The method of claim 4, wherein the fragility value defines the reconstruction-error threshold.

6. The method of claim 1, further comprising determining whether a geometry of the package is typical or atypical.

7. The method of claim 1, wherein the damage detection service includes a rules engine when sufficient training data in unavailable.

8. The method of claim 7, wherein multiple packages are loaded on the transport mechanism, further comprising determining a fragility index based on fragility values of the multiple packages.

9. The method of claim 7, wherein input to the damage detection service includes the sensor data and contextual data.

10. The method of claim 1, wherein the node and the collection device are configured to communicate with the central node via a telemetric network.

11. A non-transitory storage medium having stored therein instructions that are executable by one or more hardware processors to perform operations comprising:

associating a transport mechanism with a package, including reading an identifier of the package and an identifier of the transport mechanism;

collecting sensor data from sensors associated with the transport mechanism, wherein the sensor data is associated with the package, the sensors being configured to transmit data to a node or collection device within an environment;

determining whether the sensor data indicates that the package is damaged by evaluating the sensor data in conjunction with a fragility value encoded in the identifier of the package and using a damage detection service comprising a decision engine trained with normative sensor data to identify deviations based on reconstruction error thresholds related to a fragility index; and performing a remedial action when the sensor data indicates that the package is damaged by directing the package to an inspection location prior to shipment.

12. The non-transitory storage medium of claim 11, further comprising loading the package on the transport mechanism, the transport mechanism comprising a pallet.

13. The non-transitory storage medium of claim 11, wherein the sensors comprise inertial sensors and a gyroscope, wherein the sensors include telemetric capabilities.

14. The non-transitory storage medium of claim 11, wherein the associating step comprises storing the identifiers in a database.

15. The non-transitory storage medium of claim 14, wherein the fragility value defines the reconstruction-error threshold.

16. The non-transitory storage medium of claim 11, further comprising determining whether a geometry of the package is typical or atypical.

17. The non-transitory storage medium of claim 11, wherein the damage detection service includes a rules engine when sufficient training data in unavailable.

18. The non-transitory storage medium of claim 17, wherein multiple packages are loaded on the transport mechanism, further comprising determining a fragility index based on fragility values of the multiple packages.

19. The non-transitory storage medium of claim 17, wherein input to the damage detection service includes the sensor data and contextual data.

20. The non-transitory storage medium of claim 11, wherein the node and the collection device are configured to communicate with the central node via a telemetric network.

* * * * *